(12) United States Patent
Cho et al.

(10) Patent No.: US 8,494,095 B2
(45) Date of Patent: Jul. 23, 2013

(54) METHOD AND APPARATUS FOR DETECTING PRESENCE OF SIGNAL IN WIRELESS COMMUNICATION SYSTEM BASED ON CR TECHNOLOGY

(75) Inventors: Joon Ho Cho, Pohang-si (KR); Jeong Ho Yeo, Pohang-si (KR)

(73) Assignee: POSTECH Academy-Industry Foundation, Pohang-si (KR)

( * ) Notice: Subject to any disclaimer, the term of this patent is extended or adjusted under 35 U.S.C. 154(b) by 362 days.

(21) Appl. No.: 12/885,973

(22) Filed: Sep. 20, 2010

(65) Prior Publication Data
US 2011/0286555 A1 Nov. 24, 2011

(30) Foreign Application Priority Data
May 24, 2010 (KR) ........................ 10-2010-0048074

(51) Int. Cl.
*H03D 1/00* (2006.01)
(52) U.S. Cl.
USPC ............................ 375/343; 375/341; 455/101
(58) Field of Classification Search
USPC .................. 375/340, 343; 455/62, 63.1, 63.3, 455/296, 334, 522
See application file for complete search history.

(56) References Cited

FOREIGN PATENT DOCUMENTS

| EP | 2141878 | 1/2010 |
|---|---|---|
| KR | 10-2007-0048576 | 5/2007 |
| KR | 10-2009-0114034 | 11/2009 |

OTHER PUBLICATIONS

Yeo et al.; "Low-Complexity Near-Optimal Presence Detector for Linearly Modulated Signals" POSTECH Handout Dec. 3, 2009.
Yeo et al.; "Low-Complexity Near-Optimal Presence Detector for Linearly Modulated Signals".
IEEE GLOBECOM 2009 Symposiums Program.
Notice of Allowance for corresponding KR application No. 10-2010-0048074, issued Feb. 1, 2012.

*Primary Examiner* — Leon-Viet Nguyen
(74) *Attorney, Agent, or Firm* — Occhiuti Rohlicek & Tsao LLP

(57) ABSTRACT

The present invention relates to a method of detecting the presence of a transmission signal of a transmitter in a reception signal in a wireless communication system based on CR technology. The method includes generating a frequency signal vector using a Fourier transform and a reception signal vector obtained by sampling the reception signal at a certain period, finding an eigenvalue and an eigenvector regarding a matrix, obtaining by approximating a covariance matrix of the frequency signal vector using a vectorized Fourier transform result of all channel impulse responses of the transmission signal linearly modulated, calculating a sufficient statistic on a basis of the frequency signal vector, the eigenvalue, and the eigenvector, finding a threshold which is a criterion for determining signal presence detection on a basis of a preset detection probability or a preset false alarm probability and the eigenvalue, and if the sufficient statistic is determined to be greater than the threshold, determining that the transmission signal exists.

14 Claims, 6 Drawing Sheets

METHOD AND APPARATUS FOR DETECTING PRESENCE OF SIGNAL IN WIRELESS COMMUNICATION SYSTEM BASED ON CR TECHNOLOGY

CROSS-REFERENCE TO RELATED APPLICATIONS

This application claims the benefit of priority of Korean Patent Application No. 10-2010-0048074 filed on May 24, 2010, which are incorporated by reference in their entirety herein.

BACKGROUND OF THE INVENTION

1. Field of the Invention

The present invention relates to a wireless communication system and, more particularly, to detecting the presence of a signal in a wireless communication system based on Cognitive Radio (CR) technology.

2. Discussion of the Related Art

The present invention can be applied to technologies pertinent to a communication system, such as a cellular system, a relay system, an adhoc network, and CR communication. In communication systems, research has long been carried out on a signal detection technique. The research is made in the direction in which a detection probability is maximized and a false alarm probability is minimized.

In Korea, wireless communication technology was very limitedly used up to the 1980s (i.e., the analog generation), but has been dramatically developed after the commercialization of CDMA mobile communication in the 1990s. Today, a ubiquitous information society is coming soon. In the ubiquitous information society, however, the shortage of the frequency is serious because the demand for frequency resources is much greater than the supply thereof. Accordingly, the value of frequency resources becomes more important in line with the development of wireless communication. The efficiency of an actually distributed and measured frequency is 30% or less on average. In order to solve the shortage of frequency resources, it is necessary to develop sharing technology for efficiently using unused frequency resources.

CR technology has recently been in the spotlight as technology for significantly increasing the efficiency of frequency resources which are inefficient or not used, from among distributed frequency resources. The CR technology was developed by combining software defined radio (SDR)-based wireless communication technology and cognition technology. The SDR technology is technology in which software can be downloaded into hardware capable of performing wideband signal processing over a wide frequency band and a variety of functions can be performed. The cognition technology is computer technology for performing self-learning, while continuously gathering surrounding information, and dealing with circumstances. CR communication is being applied to IEEE (Institute of Electrical and Electronics Engineers) 802.22 which is one of wideband wireless communication schemes on which standardization is in progress.

In the CR technology, a surrounding spectrum where a device is placed is sensed, and communication is performed using empty channel information. In the case in which an incumbent user uses a corresponding frequency, communication is performed using another frequency band without interfering with the incumbent user anytime. For this function, a CR apparatus must determine whether the incumbent user uses a specific frequency by periodically placing a quiet period during the time for which the corresponding frequency is used. If the incumbent user is detected, the CR apparatus must move to another channel within a predetermined time or stop the use of the corresponding channel. In the case in which, while a CR apparatus uses a specific frequency, an incumbent user attempts to use the specific frequency, the CR apparatus detects such an attempt through spectrum sensing, moves to another frequency, and performs communication.

The term 'spectrum sensing' refers to the detection of the presence of a frequency being used by detecting a frequency spectrum environment. The spectrum sensing technology is a signal detection technique for detecting the presence of a user' signal in a corresponding frequency in order not to interfere with an incumbent user who uses an authorized frequency band. The spectrum sensing technology is core frequency resource sharing technology.

To this end, there is a need for a signal presence detection technique for detecting the presence of a user' signal in a corresponding frequency. Research is being carried out on lots of techniques in order to increase detection performance. The techniques can include, for example, a matched filter detection method, an energy detection method, and a cyclostationary characteristic detection method. The matched filter detection method is excellent in the performance, but disadvantageous in that signal information received from a transmitter must be fully known for the excellent performance. The energy detection method is simple because of a low computational load, but disadvantageous in that it is poor in the performance and sensitive to noise variance estimation error. The cyclostationary characteristic detection method is insensitive to noise variance estimation error, but has a high computational load. Meanwhile, modulation and demodulation methods used in most communication systems, such as CDMA, OFDM, and SC-FDE, are included in a linear modulation method. There is a need for an optimal signal detection technique having a low computational load while detecting a linearly modulated signal having a wide cyclostationary.

From among the detection methods, there is a need for a method of, in particular, maximizing a probability that when a transmission signal exists, a receiver will determine that the transmission signal does exist (hereinafter referred to as a 'detection probability') and minimizing a probability that when a transmission signal does not exist, a receiver will determine that the transmission signal exists (hereinafter referred to as a 'false alarm probability'). If the existing Neyman-Pearson optimum detector is used, the false alarm probability can be minimized when the detection probability is constant or the detection probability can be maximized when the false alarm probability is constant. In order to use the Neyman-Pearson optimum detector, there is a need for a process of finding an inverse matrix of a covariance matrix of signal component vectors or finding an eigenvalue and an eigenvector. In general, the process of finding the inverse matrix or the eigenvalue and the eigenvector requires a high computational load. Accordingly, there is a need for a method of detecting the presence of a signal, having the same or almost the same performance as the Neyman-Pearson optimum detector while requiring a low computational load.

SUMMARY OF THE INVENTION

An object of the present invention is to provide an optimal technique for detecting the presence of a signal, which is capable of detecting the presence of a user's transmission signal in a received linear modulation signal.

In accordance with an aspect of the present invention, there is provided a method of detecting the presence of a transmission signal, sent by a transmitter, in a reception signal in a wireless communication system based on Cognitive Radio (CR) technology, comprising generating a frequency signal vector using a Fourier transform and a reception signal vector obtained by sampling the reception signal at a certain period, finding an eigenvalue and an eigenvector regarding a matrix, obtaining by approximating a covariance matrix of the frequency signal vector using a vectorized Fourier transform result of all channel impulse responses of the transmission signal linearly modulated, calculating a sufficient statistic on the basis of the frequency signal vector, the eigenvalue, and the eigenvector, finding a threshold which is a criterion for determining signal presence detection on the basis of a preset detection probability or a preset false alarm probability and the eigenvalue, and if, as a result of the determination, the sufficient statistic is greater than the threshold, determining that the transmission signal exists.

In accordance with an aspect of the present invention, there is provided an apparatus for detecting the presence of a transmission signal, sent by a transmitter, in a reception signal in a wireless communication system based on Cognitive Radio (CR) technology, comprising a reception unit for receiving the reception signal through a channel, a transform unit for generating a frequency signal vector using a Fourier transform and a reception signal vector obtained by sampling the reception signal at a certain period, a preliminary calculation unit for finding an eigenvalue and an eigenvector regarding a matrix, obtaining by approximating a covariance matrix of the frequency signal vector using a vectorized Fourier transform result of all channel impulse responses of the transmission signal linearly modulated, a calculation unit for calculating a sufficient statistic on the basis of the frequency signal vector, the eigenvalue, and the eigenvector, finding a threshold which is a criterion for determining signal presence detection on the basis of a preset detection probability or a preset false alarm probability and the eigenvalue, and a detection unit for, if, as a result of the determination, the sufficient statistic is greater than the threshold, determining that the transmission signal exists.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
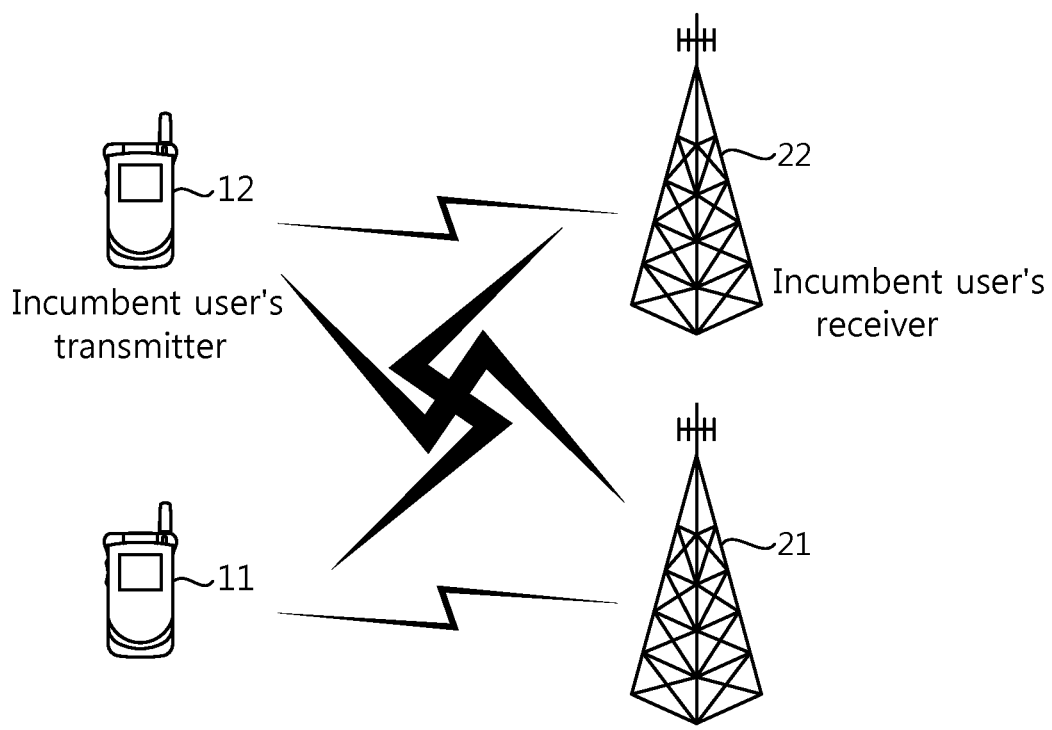
FIG. 1 is a diagram showing a wireless communication system based on CR technology.

Hereinafter, some embodiments of the present invention are described in detail with reference to the accompanying drawings. It is to be noted that in assigning reference numerals to respective elements in the drawings, the same reference numerals designate the same elements although the elements are shown in different drawings. Further, in describing the embodiments of the present invention, a detailed description of known constructions or functions will be omitted if it is deemed to make the gist of the present invention unnecessarily vague.

Further, in describing the elements of this specification, terms, such as the first, the second, A, B, (a), and (b), can be used. The terms are used to only distinguish corresponding elements from other elements, but the essence, order, sequence, etc. of the elements are not limited by the terms.

FIG. 1 is a diagram showing a wireless communication system based on CR technology.

Referring to FIG. 1, the wireless communication system includes an incumbent user's transmitter 12, one or more lower priority user's transmitter 11, an incumbent user's receiver 22 and at least one lower priority user's receiver 21. Regarding the use of a wireless channel including a specific frequency band, the incumbent user has priority. The wireless communication system senses a surrounding spectrum in which a reception apparatus is placed using CR technology and utilizes empty channel information. The wireless communication system cannot use a specific frequency when the incumbent user's transmitter 12 uses the corresponding frequency band, but perform communication using the corresponding frequency band when the incumbent user does not use the corresponding frequency.

A CR apparatus determines whether the incumbent user's transmitter 12 uses a specific frequency by placing a quiet period in order to use the corresponding frequency. When the incumbent user is detected, the CR apparatus must move to another channel within a predetermined time or stop the use of the corresponding channel.

A covariance matrix of a cyclostationary signal vector that is acquired by sampling a cyclostationary signal is a block Toeplitz matrix. A covariance matrix of a frequency signal component vector can be obtained by multiplying a discrete Fourier transform matrix before the covariance matrix and an inverse discrete Fourier transform matrix after the covariance matrix. In this case, the covariance matrix of the frequency signal component vector can be approximated in a block matrix in which each element is composed of diagonal matrices. In accordance with an embodiment of the present invention, in order to find a sufficient statistic for detecting the presence of a signal, a block matrix composed of diagonal matrices, obtained by approximating a frequency-transformed block Toeplitz matrix, is used instead of the frequency-transformed block Toeplitz matrix.

In accordance with an embodiment of the present invention, the eigenvalue and the eigenvector of a block matrix composed of diagonal matrices can be found on the basis of the frequency response of a channel from a transmitter to a receiver even without using the existing eigenvalue decomposition. A process of finding an inverse matrix or the eigenvalue decomposition process causes to increase a computational load in the existing Neyman-Pearson optimum detection technique. Accordingly, in accordance with an embodiment of the present invention, a computational load can not be increased. Further, a signal presence detection technique has almost the same performance as the Neyman-Pearson optimum detection technique.

Figure 2:
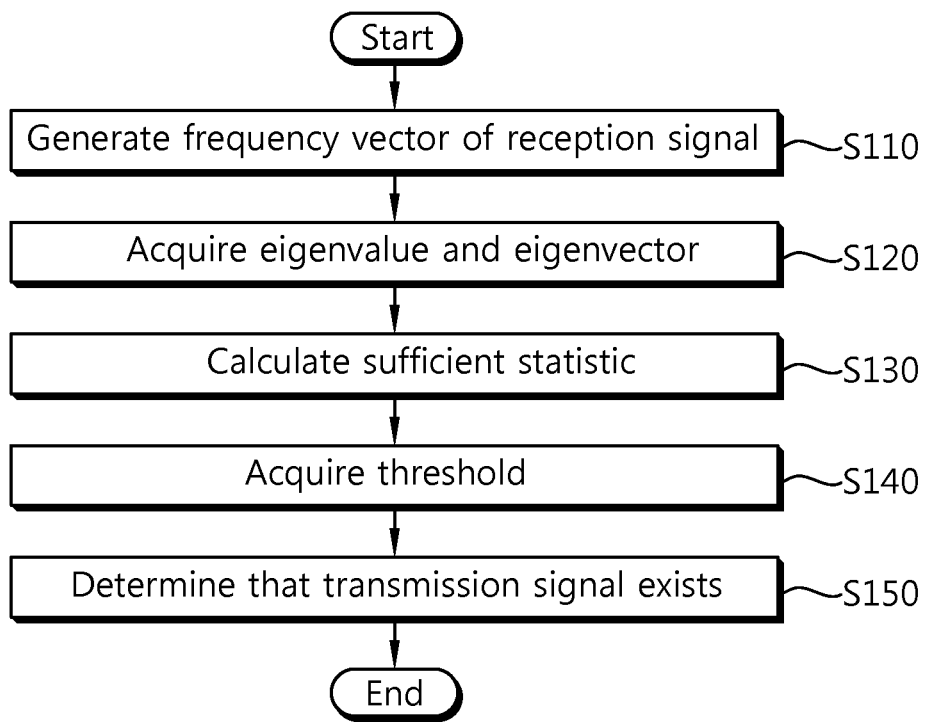
FIG. 2 is a flowchart illustrating a method of detecting the presence of a signal according to an embodiment of the present invention.

FIG. 2 is a flowchart illustrating a method of detecting the presence of a signal according to an embodiment of the present invention. The signal detection method according to the embodiment of the present invention is a detection method using a detector having a linear modulation signal characteristic.

Referring to FIG. 2, in a wireless communication system, a receiver acquires a sampled signal by sampling reception signals at a certain period and generates a frequency signal vector on the basis of the sampled signal at step S110. Here, the term 'sampling' can refer to over-sampling, and the generated frequency signal vector is used to detect a signal.

An eigenvalue and an eigenvector regarding a matrix, obtained by approximating a covariance matrix of the frequency signal vector using a vectorized Fourier transform result of all channel impulse responses of a linearly modulated transmission signal, are found at step S120. Here, the term 'all channel impulse responses' refers to an impulse response in which the effects of a transmission filter, a channel, and a reception filter are put together.

A sufficient statistic is calculated using the eigenvalue and the eigenvector generated from the matrix obtained by approximating the generated frequency signal vector and the covariance matrix of the frequency signal vector at step S130. A computational load necessary to detect the presence of a signal is determined according to a method of calculating the sufficient statistic. In order to perform Neyman-Pearson optimum detection using the existing method, a process of finding an inverse matrix of $R_s$ (i.e., a covariance matrix of a signal component vector) or of $S_s$ (i.e., a covariance matrix of a frequency signal component vector) or an eigenvalue decomposition that means getting an eigenvalue by decomposing a certain matrix is necessary. In general, a high computational load is necessary in the process of finding the inverse matrix of the matrix $R_s$ or the matrix $S_s$ and the eigenvalue decomposition.

In the present invention, the matrix $S_s$ is approximated in another matrix $\hat{S}_s$, and an eigenvalue and an eigenvector of the approximated matrix $\hat{S}_s$ are found. A detailed process of finding the eigenvalue and the eigenvector of the matrix $\hat{S}_s$ according to an embodiment of the present invention is described later with reference to FIGS. 2 and 3. The matrix $\hat{S}_s$ is a block matrix composed of several diagonal matrices. Accordingly, an eigenvalue decomposition process is not necessary in finding the eigenvalue and the eigenvector of the matrix $\hat{S}_s$, and the eigenvalue and the eigenvector of the matrix $\hat{S}_s$ are found using the frequency response of a channel from a transmitter to a receiver.

Next, a threshold (i.e., a criterion for determining signal detection) is found using a preset detection probability or a preset false alarm probability and the eigenvalue at step S140. In this case, a reversed function of a Q function, indicating a probability that a value higher than a certain value in a standard normal distribution can be obtained, is used.

Finally, it is determined whether a transmission signal (e.g., a signal sent by an incumbent user) to be detected exists by comparing the sufficient statistic and the threshold at step S150. If, as a result of the determination, the sufficient statistic is greater than the threshold, the signal is determined to exist. If, as a result of the determination, the sufficient statistic is smaller than or equal to the threshold, the signal is determined not to exist.

Figure 3:
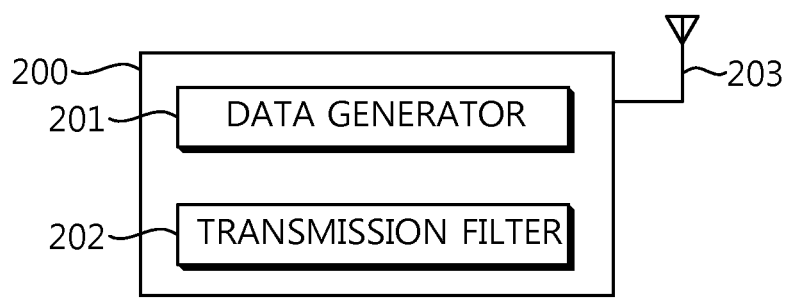
FIG. 3 is a block diagram showing the transmitter 200 of a wireless communication system for transmitting a signal.
Figure 4:
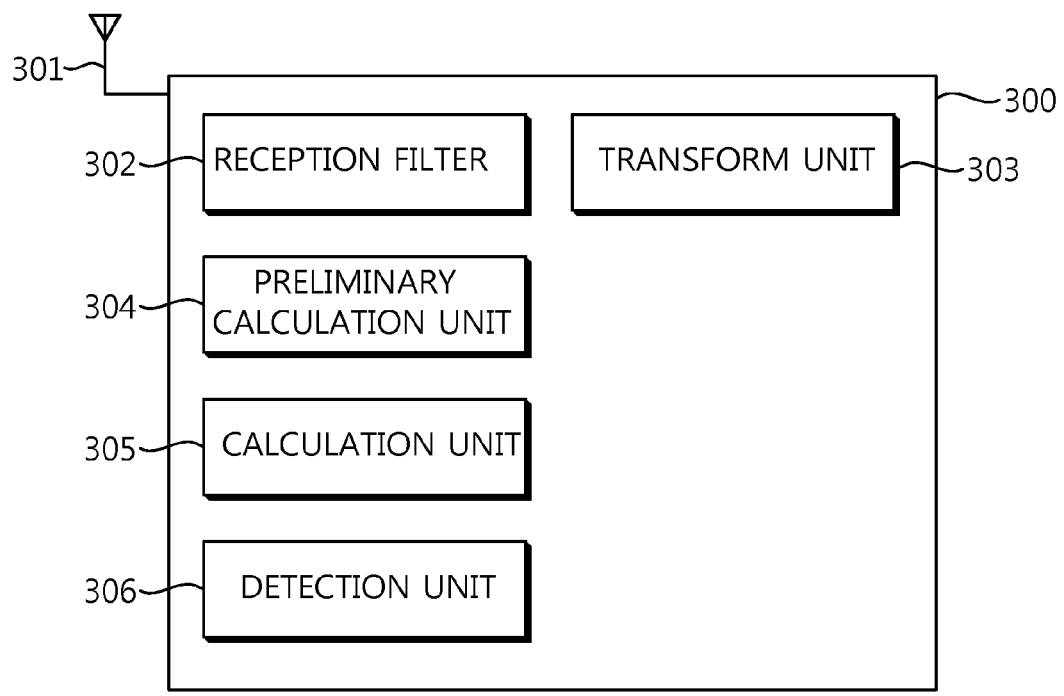
FIG. 4 is a block diagram showing a receiver 300 which is an apparatus for detecting the presence of a signal according to an embodiment of the present invention.

FIGS. 3 and 4 show a wireless communication system in which a signal detection technique is used.

FIG. 3 is a block diagram showing the transmitter 200 of a wireless communication system for transmitting a signal.

Referring to FIG. 3, the transmitter 200 can include a data generator 201, a transmission filter 202, and a transmission antenna 203. Data generated by the data generator 201 are sent to a receiver 300 via the transmission filter 202 and the transmission antenna 203. A data symbol b[k] to be sent by the transmitter 200 can be modeled in a probability variable which is independent and is 0 in average and 1 in variance. The transmitter 200 can linearly modulate the data symbol b[k] using a transmission waveform p(t) in the state in which the period of the data symbol is set to T and send the linearly modulated data symbol.

FIG. 4 is a block diagram showing the receiver 300 which is an apparatus for detecting the presence of a signal according to an embodiment of the present invention. The receiver 300 corresponds to a signal detection apparatus. The receiver 300 as the signal detection apparatus can use the signal detection technique according to the embodiment of the present invention. Hereinafter, the apparatus for detecting the presence of a signal according to the embodiment of the present invention is referred to as the receiver 300, for convenience sake.

Referring to FIG. 4, a transmission signal sent by the transmitter 200 can be received by the receiver 300 through a reception antenna 301 via a channel. The receiver 300 can include the reception antenna 301, a reception filter 302, a transform unit 303, a preliminary calculation unit 304, a calculation unit 305, and a detection unit 306. Here, the reception antenna 301 and the reception filter 302 can be collectively called a reception unit (not shown). The reception unit (not shown) receives a signal from a transmitter via a channel, and the transform unit 303 generates a frequency signal vector using a reception signal vector, obtained by sampling the received signal at a certain period, and Fourier transform. The preliminary calculation unit 304 finds an eigenvalue and an eigenvector regarding a matrix which is obtained by approximating a covariance matrix of the frequency signal vector using a vectorized Fourier transform result of all channel impulse responses of the linearly modulated transmission signal. The calculation unit 305 finds a sufficient statistic using the frequency signal vector, the eigenvalue, and the eigenvector and finds a threshold (i.e., a criterion for determining signal detection) using a preset detection probability or a present false alarm probability and the eigenvalue. Finally, the detection unit 306 determines that a signal to be detected exists if the sufficient statistic is greater than the threshold.

Assuming that a reception signal is y(t) white noise N(t) is added to y(t). A reception signal passes through the reception filter 302. Assuming that the impulse response of a channel is h(t), the impulse response of the reception filter is g(−t)*, and the impulse response of all channels in which the effects of a transmission filter, a channel, and a reception filter in the transmitter are put together is q(t), q(t) can be defined as the following equation 1.

$$q(t) \triangleq p(t)*h(t)*g(-t)^* \qquad \text{[Equation 1]}$$

where the superscript * indicates a conjugate, and * operation indicates a convolution.

Assuming that a signal component is s(t) and a noise component is w(t) when the reception signal y(t) has passed through the reception filter 302, s(t) and w(t) can be defined as the following equations 2 and 3. In this case, the reception signal y(t) can be expressed using the sum of s(t) and w(t)

$$s(t) = \sum_{k=-\infty}^{\infty} b[k]q(t-kT) \qquad \text{[Equation 2]}$$

$$w(t) = N(t)*g(-t)^* \qquad \text{[Equation 3]}$$

When the reception signal y(t) passed through the reception filter 302 is sampled in the transform unit 303 at a cycle of T/M, a reception signal vector y having a length of KM can be obtained.

In this case, the reception signal vector y can be defined as $y \triangleq [y[1], y[2], \ldots, y[KM]]^{\mathcal{T}}$. Each of the components of y can be defined as $$y[l] \triangleq y\left(l\frac{T}{M}\right).$$

Here, the superscript $\mathcal{T}$ indicates the transpose of the vector. The reception signal vector y can be divided into a signal component vector $s \triangleq [s[1], s[2], \ldots, s[KM]]^{\mathcal{T}}$ and a noise component vector $w \triangleq [w[1], w[2], \ldots, w[KM]]^{\mathcal{T}}$. The component of each vector is defined as the following equations 4 and 5.

$$s[l] \triangleq s\left(\frac{lT}{M}\right) = \sum_{k=-\infty}^{\infty} b[k] q\left(\frac{lT}{M} - kT\right) \quad \text{[Equation 4]}$$

$$w[l] \triangleq w\left(\frac{lT}{M}\right) = \int_{-\infty}^{\infty} g\left(t - \frac{lT}{M}\right)^* N(t) dt \quad \text{[Equation 5]}$$

where K indicates a period number in which a signal is received, and M indicates an over-sampling rate.

An autocorrelation function $r_s(t_1, t_2)$ of the signal component s(t) from the reception signal can be defined as the following equation 6. A $(l_1, l_2)^{th}$ component of a covariance matrix $R_s$ of a signal component vector $s$ found using the autocorrelation function $r_s(t_1, t_2)$ can be defined as the following equation 7.

$$r_s(t_1, t_2) = \sum_{l=-\infty}^{\infty} q(t_1 - lT) q(t_2 - lT)^* \quad \text{[Equation 6]}$$

$$[R_s]_{l_1, l_2} = \mathbb{E}\{s[l_1] s[l_2]^*\} = r_s\left(\frac{l_1 T}{M}, \frac{l_2 T}{M}\right) \quad \text{[Equation 7]}$$

A frequency signal vector Wy can be found by multiplying a discrete Fourier transform matrix W and the reception signal vector y. In this case, a $(k_1, k_2)^{th}$ component of W can be defined as the following equation 8. Here, [x] indicates a maximum integer not greater than x.

$$[W]_{k_1, k_2} \triangleq \frac{1}{\sqrt{KM}} e^{-j2\pi \frac{1}{KM}(k_1 - \lceil \frac{KM+1}{2} \rceil)(k_2 - \lceil \frac{KM+1}{2} \rceil)}. \quad \text{[Equation 8]}$$

A covariance matrix $S_s$ of the frequency signal vector Wy can be defined as $S_s \triangleq W R_s W^{\mathcal{H}}$. Here, the superscript $\mathcal{H}$ indicates a Hermitian transpose.

A sufficient statistic l(y) for the existing Neyman-Pearson optimum detection for detecting the presence of a signal can be defined as the following equation 9.

$$l(y) = \sum_{k=1}^{KM} \frac{\lambda_k}{\sigma_N^2 (\sigma_N^2 + \lambda_k)} |v_k^{\mathcal{H}} W y|^2 \quad \text{[Equation 9]}$$

where $\lambda_k$ and the vector $v_k$ indicate a $k^{th}$ eigenvalue and a $k^{th}$ eigenvector of the covariance matrix $S_s$, and $\sigma_N^2$ indicates a variance of the noise vector component.

The above technique for finding a sufficient statistic is problematic in that the eigenvalue decomposition of the covariance matrix $S_s$ is necessary in order to find the eigenvalue $\lambda_k$ and the eigenvector $v_k$ and a computational load required in this process is proportional to $K^2$. Such a computational load is higher than a computational load required in the energy detection method.

Hereinafter, a method of detecting the presence of a signal using an approximated eigenvalue and an approximated eigenvector according to the present invention is described.

The preliminary calculation unit 304 of the receiver can find an approximate eigenvalue and an approximate eigenvector of a frequency signal vector with a low computational load. A matrix $\hat{S}_s$ obtained by approximating a covariance matrix $S_s$ of a frequency signal component vector is used. The matrix $\hat{S}_s$ is defined as the following equation 10.

$$\hat{S}_s \triangleq \begin{bmatrix} \hat{S}_s^{(1,1)} & \hat{S}_s^{(1,2)} & \cdots & \hat{S}_s^{(1,M)} \\ \hat{S}_s^{(2,1)} & \hat{S}_s^{(2,2)} & \cdots & \hat{S}_s^{(2,M)} \\ \vdots & \vdots & \ddots & \vdots \\ \hat{S}_s^{(M,1)} & \hat{S}_s^{(M,2)} & \cdots & \hat{S}_s^{(M,M)} \end{bmatrix} \quad \text{[Equation 10]}$$

where a $(i, j)^{th}$ lower matrix $\hat{S}_s^{(i,j)}$ indicates a K×K diagonal matrix, and the $k^{th}$ diagonal component of each $\hat{S}_s^{(i,j)}$ matrix is defined as the following equation 11.

$$[\hat{S}_s^{(i,j)}]_{(k,k)} \triangleq M \cdot \quad \text{[Equation 11]}$$

$$\tilde{R}_s\left(-\frac{M}{2T} + \frac{(i-1)}{T} + \frac{(k-1)}{KT}, -\frac{M}{2T} + \frac{(j-1)}{T} + \frac{(k-1)}{KT}\right)$$

where $i, j = 1, \ldots, M$, and $k = 1, \ldots, K$. $\tilde{R}_s(\xi, \hat{\xi})$ indicates the size of a dual Fourier transform of an autocorrelation function $r_s(t_1, t_2)$ of a signal component s(t) of a reception signal.

The $\tilde{R}_s(\xi, \hat{\xi})$ can also be found using the following method.

$$\tilde{R}_s(\xi, \hat{\xi}) \triangleq \frac{1}{T} Q(\xi) Q(\hat{\xi})^* \quad \text{[Equation 12]}$$

where $Q(\xi)$ indicates a Fourier transform of all channel impulse responses q(t).

The vector q(f) indicates a vectorized Fourier transform of all the channel impulse responses q(t) and can be defined as the following equation 13.

$$q(f) \triangleq \quad \text{[Equation 13]}$$

$$\left[ Q\left(-\frac{M}{2T} + f\right), Q\left(-\frac{M-2}{2T} + f\right), \ldots, Q\left(\frac{M-2}{2T} + f\right) \right]^T$$

where the frequency offset f has a range of $0 \leq f < 1/T$.

The matrix $\hat{S}_s$ obtained by approximating the covariance matrix of the frequency signal component vector can be expressed using the following equation 14.

$$\hat{S}_s = \sum_{k=1}^{K} q_k q_k^{\mathcal{H}} \quad \text{[Equation 14]}$$

where $q_k$ indicates an unnormalized eigenvector with a length of KM and can be defined as the following equation 15.

$$q_k \triangleq \sqrt{M/T} q(k/T) \otimes e_k \quad \text{[Equation 15]}$$

where $\otimes$ indicates a Kronecker product, and $e_k$ of indicates a standard fundamental vector.

In this case, when $i \neq j$ in $q_i$ and $q_j$, $q_i$ and $q_j$ are orthogonal to each other. Accordingly, the vector $q_k$ can become an unnormalized eigenvector of the matrix $\hat{S}_s$. An eigenvalue and an eigenvector of the matrix $\hat{S}_s$ can be defined as the following equations 16 and 17.

$$\hat{\lambda}_k = \|q_k\|^2 \quad \text{[Equation 16]}$$

$$\hat{v}_k = q_k / \|q_k\| \quad \text{[Equation 17]}$$

Where $k=1, \ldots, K$, a (KM−K) number of the remaining eigenvalues become 0, and a corresponding eigenvector can become a certain vector.

Next, the calculation unit 305 calculates an approximate value $\hat{l}(y)$ of a sufficient statistic using the following equation 18.

$$\hat{l}(y) = \sum_{k=1}^{K} \frac{\hat{\lambda}_k}{\sigma_N^2 (\sigma_N^2 + \hat{\lambda}_k)} |\hat{v}_k^{\mathcal{H}} W y|^2 \quad \text{[Equation 18]}$$

where $\hat{\lambda}_k$ is a $k^{th}$ eigenvalue of the matrix $\hat{S}_s$, $\hat{v}_k^H$ is Hermitian transpose of the $k^{th}$ eigenvector of the matrix $\hat{S}_s$, $\sigma_N^2$ is a variance value of a noise component, and Wy is a frequency signal vector.

In the case in which the approximate value $\hat{l}(y)$ of the sufficient statistic is used, a computational load can be lowered because the eigenvalue decomposition of a covariance matrix is not necessary. A final computational load is proportional to K log K, which is a computational load generated in a process of transforming the signal vector into the frequency signal vector.

Next, the calculation unit 305 finds a threshold η of the sufficient statistic $\hat{l}(y)$ approximated using the eigenvalue. The threshold η can be defined as the following equations 19 and 20 using a Q function so that it satisfies a preset detection probability $P_D$ or a certain false alarm probability $P_{FA}$. Equation 19 is the threshold of the approximated sufficient statistic $\hat{l}(y)$ for making the detection probability become $P_D$.

$$\eta = \sqrt{\sum_{k=1}^{K} \left(\frac{\hat{\lambda}_k}{\sigma_N^2}\right)^2} Q^{-1}(P_D) + \sum_{k=1}^{K} \frac{\hat{\lambda}_k}{\sigma_N^2} \quad \text{[Equation 19]}$$

The following equation 20 is the threshold of the approximated sufficient statistic $\hat{l}(y)$ for making the false alarm probability become $P_{FA}$.

$$\eta = \sqrt{\sum_{k=1}^{K} \left(\frac{\hat{\lambda}_k}{\sigma_N^2 + \hat{\lambda}_k}\right)^2} Q^{-1}(P_{FA}) + \sum_{k=1}^{K} \frac{\hat{\lambda}_k}{\sigma_N^2 + \hat{\lambda}_k} \quad \text{[Equation 20]}$$

Finally, the detection unit 306 compares the approximated sufficient statistic $\hat{l}(y)$ and the threshold η. If, as a result of the comparison, the sufficient statistic l(y) is greater than the threshold η, the detection unit 306 determines that a signal to be detected exists in the reception signal. If, as a result of the comparison, the sufficient statistic l(y) is smaller than or equal to the threshold η, the detection unit 306 determines that a signal to be detected does not exist in the reception signal.

Figure 5:
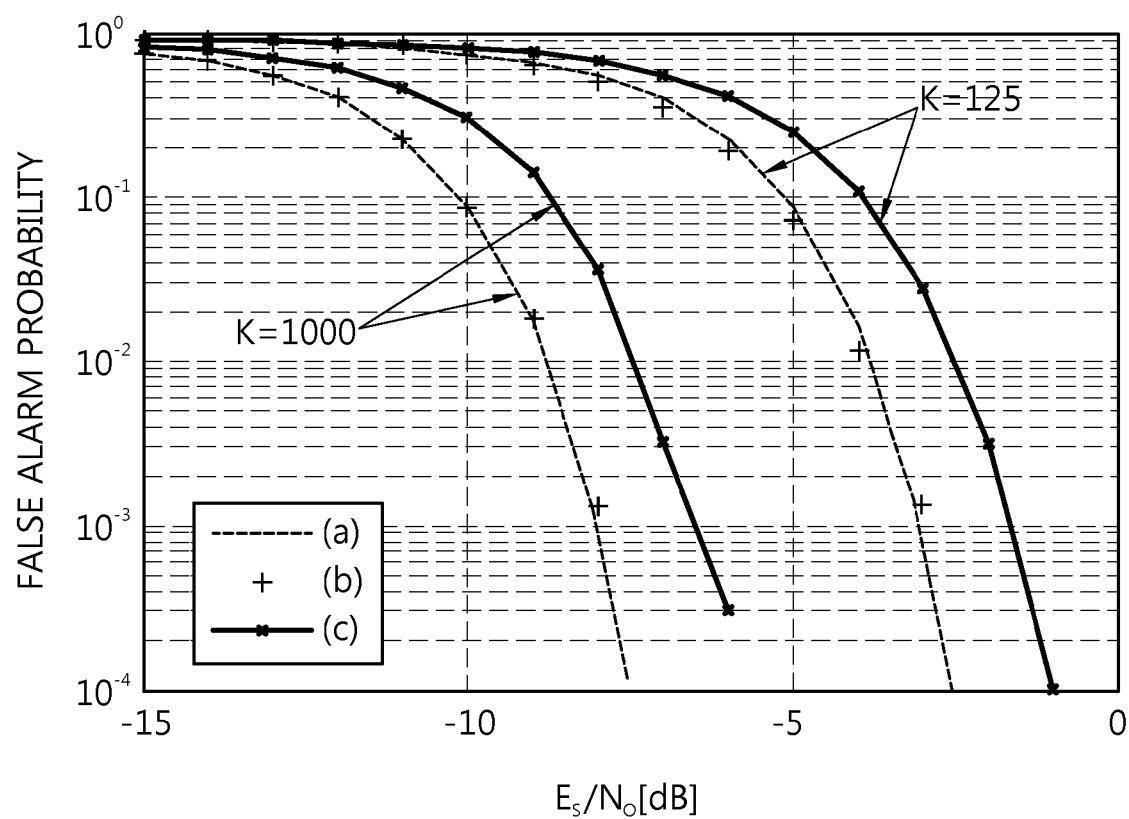
FIG. 5 is a graph showing a false alarm probability of the apparatus for detecting the presence of a signal according to the embodiment of the present invention.

FIG. 5 is a graph showing a false alarm probability of the apparatus for detecting the presence of a signal according to the embodiment of the present invention.

FIG. 5 show results when the detection probability is 95%, and the results can be changed according to a detection probability. Here, the excess bandwidth of a system was 0.5, and observation periods K were 125 and 1000. With an increase in the observation period, the false alarm probability is decreased. In FIG. 5, (a) indicates the performance of the Neyman-Pearson optimum detector, (b) indicates the performance of a detection technique using the sufficient statistic $\hat{l}(y)$ approximated using the method according to the present invention, and (c) indicates the performance of the energy detector. It can be seen that the detection technique using the approximated sufficient statistic has better performance than the energy detector and has almost the same performance as the Neyman-Pearson optimum detector.

Figure 6:
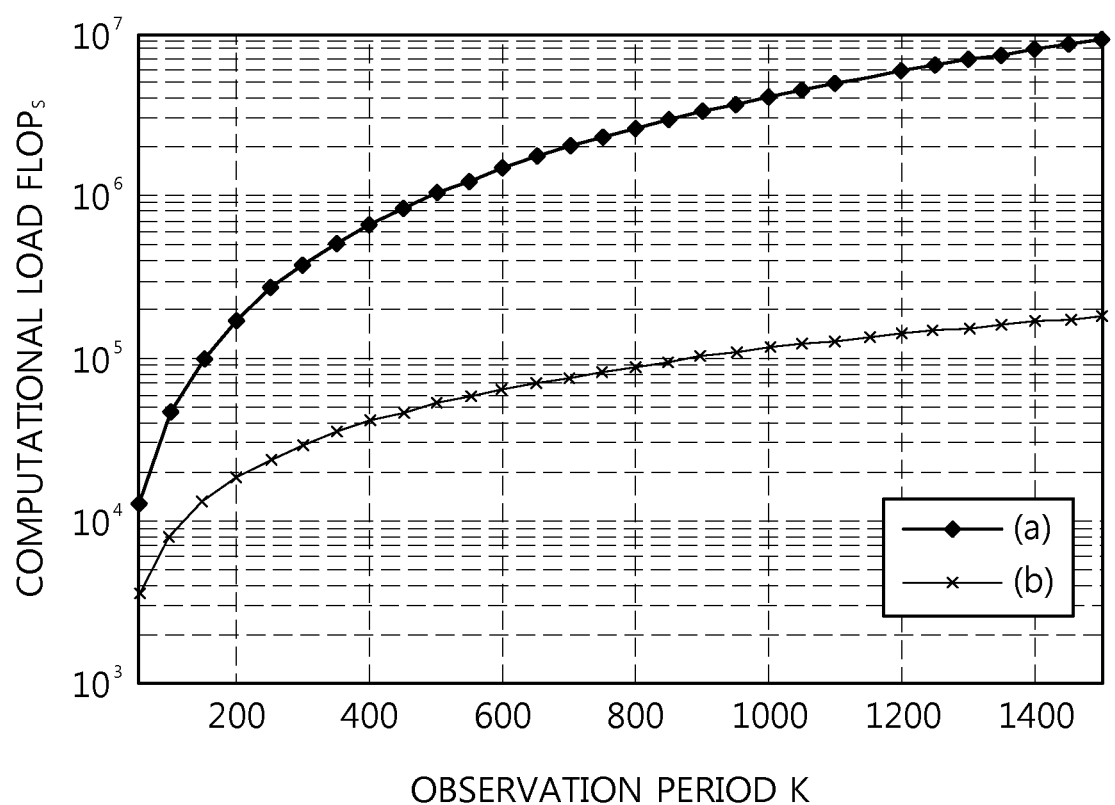
FIG. 6 is a graph showing a computational load of the apparatus for detecting the presence of a signal according to the embodiment of the present invention.

FIG. 6 is a graph showing a computational load of the apparatus for detecting the presence of a signal according to the embodiment of the present invention. With an increase of the observation period K, the length of a signal vector is increased and thus a computational load is increased. In FIG. 6, (a) indicates a computational load of the Neyman-Pearson optimum detection technique, and (b) indicates a computational load of the proposed detection technique. In (a), the computational load of the Neyman-Pearson optimum detection technique is proportional to $K^2$. In (b), the computational load of the technique for detecting the presence of a signal according to the present invention is proportional to K log K. It can be seen that the two signal presence detection techniques have quite different computational loads.

The embodiment of the present invention can be executed by a microprocessor, a controller, a microcontroller, a processor such as ASIC (Application Specific Integrated Circuit), a calculation unit of a terminal such as that shown in FIG. 3, or a processor according to software or a program code coded to execute the embodiment. It can be said that the design, development, and implementation of the code are evident to those skilled in the art on the basis of the description of the present invention.

In accordance with the present invention, in the case in which the presence of a linearly modulated signal is to be detected, excellent detection performance can be achieved as compared with the existing energy detection method, and a computational load can be reduced as compared with the matched filter detection method.

While some exemplary embodiments of the present invention have been described with reference to the accompanying drawings, those skilled in the art can change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments. The scope of the present invention should be interpreted according to the following appended claims. Accordingly, the present invention should be construed to cover all modifications or variations induced from the meaning and scope of the appended claims and their equivalents.

What is claimed is:

1. A method of detecting a presence of a transmission signal, sent by a transmitter, in a reception signal in a wireless communication system based on Cognitive Radio (CR) technology, the method comprising:
generating a frequency signal vector using a Fourier transform and a reception signal vector obtained by sampling the reception signal at a certain period;
finding an eigenvalue and an eigenvector of a matrix obtained by approximating a covariance matrix of the frequency signal vector by using a vectorized Fourier transform result of a channel impulse response of a transmission signal;
calculating a sufficient statistic on a basis of the frequency signal vector, the eigenvalue, and the eigenvector;
finding a threshold which is a criterion for determining signal presence detection on a basis of a preset detection probability or a preset false alarm probability and the eigenvalue; and
if, as a result of the determination, the sufficient statistic is greater than the threshold, determining that the transmission signal exists.

2. The method of claim 1, wherein the frequency signal vector is a product of a discrete Fourier transform matrix and a reception signal vector obtained by sampling the reception signal.

3. The method of claim 1, wherein:
the eigenvector is proportional to the vectored Fourier transform result of all the channel impulse responses and a Kronecker product of a standard fundamental vector, and
the eigenvalue is proportional to a square of the vectored Fourier transform result of all the channel impulse responses and the Kronecker product of the standard fundamental vector.

4. The method of claim 1, wherein:
the matrix obtained by approximating the covariance matrix of the frequency signal vector is a block matrix in which each element is a diagonal matrix, and
a diagonal component of each of the diagonal matrices is proportional to a dual Fourier transform result of an autocorrelation function of the reception signal.

5. The method of claim 1, wherein the sufficient statistic $$\hat{l}(y) \text{ is } \hat{l}(y) = \sum_{k=1}^{K} \frac{\hat{\lambda}_k}{\sigma_N^2(\sigma_N^2 + \hat{\lambda}_k)} |\hat{v}_k^H Wy|^2$$

where $\hat{\lambda}_k$ a kth eigenvalue of the matrix obtained by approximating the covariance matrix of the frequency signal vector, $\hat{v}_k^H$ a Hermitian transpose of the kth eigenvector of the matrix obtained by approximating the covariance matrix of the frequency signal vector, $\sigma_N^2$ is a variance value of a noise component, and Wy is the frequency signal vector.

6. The method of claim 1, wherein the threshold $\eta$ is $$\eta = \sqrt{\sum_{k=1}^{K} \left(\frac{\hat{\lambda}_k}{\sigma_N^2}\right)^2} Q^{-1}(P_D) + \sum_{k=1}^{K} \frac{\hat{\lambda}_k}{\sigma_N^2}$$

for a detection probability $P_D$ where $\hat{\lambda}_k$ is a kth eigenvalue of the matrix obtained by approximating the covariance matrix of the frequency signal vector, $\sigma_N^2$ is a variance value of a noise component, $Q^{-1}(x)$ is a reversed function of a function $Q(x)$, the function $Q(x)$ is a probability that the function $Q(x)$ can have a value greater than x in a standard normal distribution, and K is a period number in which a signal is received.

7. The method of claim 1, wherein the threshold $\eta$ is $$\eta = \sqrt{\sum_{k=1}^{K} \left(\frac{\hat{\lambda}_k}{\sigma_N^2 + \hat{\lambda}_k}\right)^2} Q^{-1}(P_{FA}) + \sum_{k=1}^{K} \frac{\hat{\lambda}_k}{\sigma_N^2 + \hat{\lambda}_k}$$

for a false alarm probability $P_{FA}$ where $\hat{\lambda}_k$ a kth eigenvalue of the matrix obtained by approximating the covariance matrix of the frequency signal vector, $\sigma_N^2$ is a variance value of a noise component, $Q^{-1}(x)$ is a reversed function of a function $Q(x)$, the function $Q(x)$ is a probability that the function $Q(x)$ can have a value greater than x in a standard normal distribution, and K is a period number in which a signal is received.

8. An apparatus for detecting a presence of a transmission signal, sent by a transmitter, in a reception signal in a wireless communication system based on Cognitive Radio (CR) technology, the apparatus comprising:
a reception unit for receiving the reception signal through a channel;
a transform unit for generating a frequency signal vector using a Fourier transform and a reception signal vector obtained by sampling the reception signal at a certain interval;
a preliminary calculation unit for finding an eigenvalue and an eigenvector of a matrix obtained by approximating a covariance matrix of the frequency signal vector by using a vectored Fourier transform result of a channel impulse response of a transmission signal;
a calculation unit for calculating a sufficient statistic on a basis of the frequency signal vector, the eigenvalue, and the eigenvector;
finding a threshold which is a criterion for determining signal presence detection on a basis of a preset detection probability or a preset false alarm probability and the eigenvalue; and
a detection unit for, if, as a result of the determination, the sufficient statistic is greater than the threshold, determining that the transmission signal exists.

9. The apparatus of claim 8, wherein the frequency signal vector is a product of a discrete Fourier transform matrix and a reception signal vector obtained by sampling the reception signal.

10. The apparatus of claim 8, wherein:
the eigenvector is proportional to the vectored Fourier transform result of all the channel impulse responses and a Kronecker product of a standard fundamental vector, and
the eigenvalue is proportional to a square of the vectored Fourier transform result of all the channel impulse responses and the Kronecker product of the standard fundamental vector.

11. The apparatus of claim 8, wherein:
the matrix obtained by approximating the covariance matrix of the frequency signal vector is a block matrix in which each element is a diagonal matrix, and
a diagonal component of each of the diagonal matrices is proportional to a dual Fourier transform result of an autocorrelation function of the reception signal.

12. The apparatus of claim 8, wherein the sufficient statistic $$\hat{l}(y) \text{ is } \hat{l}(y) = \sum_{k=1}^{K} \frac{\hat{\lambda}_k}{\sigma_N^2(\sigma_N^2 + \hat{\lambda}_k)} |\hat{v}_k^{\mathcal{H}} Wy|^2$$

where $\hat{\lambda}_k$ a kth eigenvalue of the matrix obtained by approximating the covariance matrix of the frequency signal vector, $\hat{v}_k^H$ a Hermitian transpose of the kth eigenvector of the matrix obtained by approximating the covariance matrix of the frequency signal vector, $\sigma_N^2$ is a variance value of a noise component, and Wy is the frequency signal vector.

13. The apparatus of claim 8, wherein the threshold η is $$\eta = \sqrt{\sum_{k=1}^{K} \left(\frac{\hat{\lambda}_k}{\sigma_N^2}\right)^2 Q^{-1}(P_D) + \sum_{k=1}^{K} \frac{\hat{\lambda}_k}{\sigma_N^2}}$$

for a detection probability $P_D$ where $\hat{\lambda}_k$ is a kth eigenvalue of the matrix obtained by approximating the covariance matrix of the frequency signal vector, $\sigma_N^2$ is a variance value of a noise component, $Q^{-1}(x)$ is a reversed function of a function Q(x), the function Q(x) is a probability that the function Q(x) can have a value greater than x in a standard normal distribution, and K is a period number in which a signal is received.

14. The apparatus of claim 8, wherein the threshold η is $$\eta = \sqrt{\sum_{k=1}^{K} \left(\frac{\hat{\lambda}_k}{\sigma_N^2 + \hat{\lambda}_k}\right)^2 Q^{-1}(P_{FA}) + \sum_{k=1}^{K} \frac{\hat{\lambda}_k}{\sigma_N^2 + \hat{\lambda}_k}}$$

for a false alarm probability $P_{FA}$ where $\hat{\lambda}_k$ a kth eigenvalue of the matrix obtained by approximating the covariance matrix of the frequency signal vector, $\sigma_N^2$ is a variance value of a noise component, $Q^{-1}(x)$ is a reversed function of a function Q(x), the function Q(x) is a probability that the function Q(x) can have a value greater than x in a standard normal distribution, and K is a period number in which a signal is received.

* * * * *